Oct. 7, 1969   G. BORGGREEN   3,471,275
METHOD OF DISPOSAL OF REFUSE
Filed June 26, 1964

INVENTOR
Georg Borggreen

BY *Spencer & Kaye*
ATTORNEYS

United States Patent Office 3,471,275
Patented Oct. 7, 1969

3,471,275
METHOD OF DISPOSAL OF REFUSE
Georg Borggreen, 61 Frydsvej, Kolding, Denmark
Filed June 26, 1964, Ser. No. 386,108
Claims priority, application Denmark, June 26, 1963,
3,023/63; Sept. 30, 1963, 4,589/63
Int. Cl. C10j 1/20
U.S. Cl. 48—209                                      5 Claims

ABSTRACT OF THE DISCLOSURE

A method for disposing of refuse materials wherein such materials are fed to a retort and heated therein to a temperature between from about 900° C. to about 1200° C. The retort is externally heated. Refuse gas produced in the retort is conducted through a heat exchanger where heat released by the condensation of water vapors is usefully employed and the cooled refuse gas is then mixed with a base gas.

Figure 1:
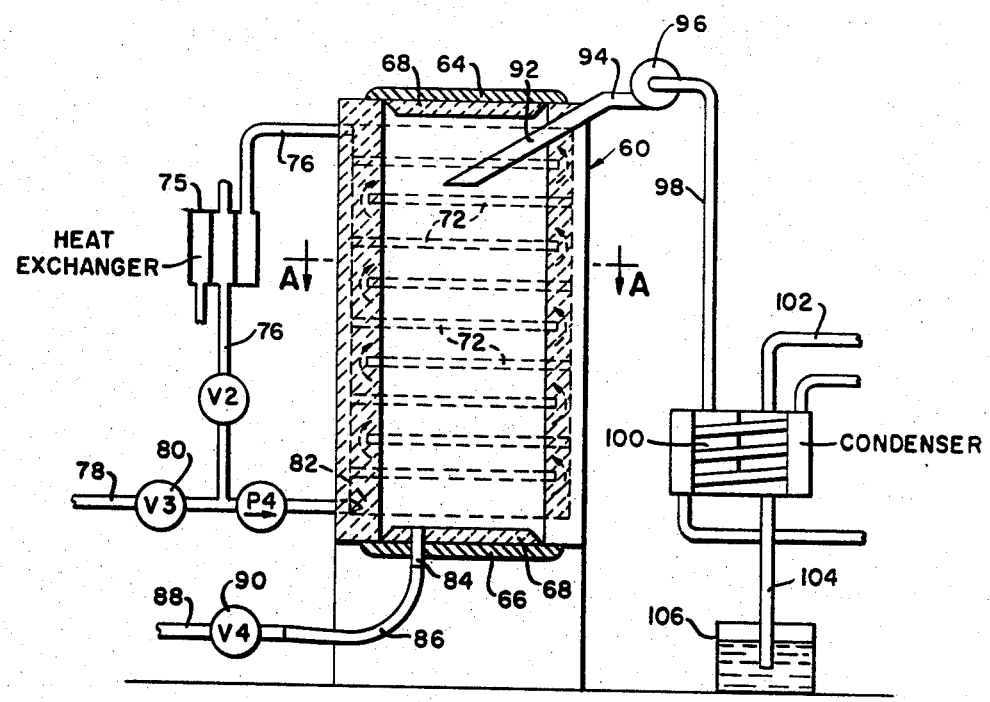

The present invention relates to methods of disposal of refuse.

In the modern community the removal of refuse such as garbage, rubbish, sewage sludge and the like presents great problems. There are limits to the amount of refuse that can be discharged in the refuse dumps, and consequently it has been widely used to burn such refuse in incinerators so that the dumps should only receive ashes and slags which cannot be used in any other way. Such incinerators have, however, required an expensive and complicated machinery and high chimneys provided the refuse should be burnt without giving off smell and smoke. To obtain a better economy, it has been attempted to use the combustion heat for production of steam or for district heating, but even in such cases the removal of refuse is connected with great expenses.

An object of the invention is to dispose of refuse in an economical way.

Another object of the invention is to dispose of refuse, such as garbage, rubbish, sewage sludge and the like, without smoke, fumes or noxious gases being given off to the surroundings, and without high chimneys being necessary.

A further object of the invention is to make it possible to produce a refuse-gas from refuse and to use such refuse-gas as auxiliary or supplementing gas in connection with the producing and/or distribution of town-gas.

Still a further object of the invention is to dispose of refuse such as garbage, rubbish, sewage sludge and the like without expensive drying operations or the consumption of expensive supplemental fuels.

Another object of the invention is to provide a method by which it is possible in a simple way to produce a cheap and useful gas and simultaneously in an easy and cheap way to get rid of refuse.

An important feature of the invention is by degassing of refuse, such as garbage, rubbish, sewage sludge and the like, to produce a refuse gas which thereupon is utilized as an auxiliary or supplementing gas in connection with the production and/or distribution of town gas.

Gas based on refuse will of course, like most other raw gases, contain a good deal of impurities which, however, in a manner known per se, can easily be removed, for example in cyclone filters and possibly also scrubbers, and in case the refuse gas is to be used as supplementing gas, it may also in a manner known per se be completely or partly relieved of carbon dioxide, for example by treatment with lime. Even as supplementing gas any further cleaning should, however, be unnecessary in connection with coal and oil gas since any substances to be removed will ordinarily also be present in the raw gas and can be removed by the cleaning of the latter after the supplementing refuse gas has been added thereto.

According to this invention, however, refuse gas is produced by the refuse being fed to and heated in a retort heated from the outside, for example, in a retort furnace. In such a furnace the refuse gas will be produced partly by a partial combustion taking place during the first part of the heating period and being due to the comparatively great content in the refuse of oxygen and of materials liberating oxygen and partly as a pure degassing. Consequently, the refuse gas leaving the retort at different times of the heating period varies in composition, but it has been found that the resulting mixed refuse gas, especially as to relative density is extremely well suited for being mixed into ordinary town gas such as coal gas, propane gas; oil gas as well as gas produced in other manners.

Figure 2:
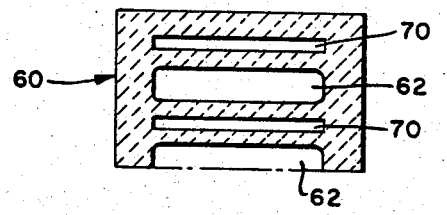

The above said and further objects and advantages of the invention will become more clear from the following description of specific examples of the invention, together with the accompanying drawings, in which FIG. 1 shows schematically, partly in section, a retort furnace for the production of gas and which is especially designed for degassing refuse, and FIG. 2 is sectional view on the line A—A in FIG. 1.

The retort furnace shown in the drawing is built from refractory material and comprises a number of retort chambers 62 at the top closed by a removable cover 64 and at the bottom by a removable cover 66. These two covers 64 and 66 are made from cast iron and are on their inner sides provided with a lining 68 of refractory material.

On each side of each chamber 62 the furnace is provided with a heating chamber 70, although one such chamber 70 is common for two neighboring retort chambers 62. Each heating chamber 70 is provided with a number of horizontal partitions 72 which extend alternately from one and then the other end wall of the chamber 70 and end in a short distance from the other end wall so that combustion products provided by burning a mixture of air and gas in the lower part of the chamber 70 are carried in zigzag fashion through the chamber 70. The combustion air leaves the chamber 70 at its upper end via a pipe 76 and is led to a heat exchanger 75 and from there to the atmosphere. In the heat exchanger 75 the combustion products preheat combustion air which, through a pipe 76 with an adjusting valve V2, is led to a pump P4 by which it is blown into the lower end of the combustion chamber. The pump P4 also sucks gas from a gas pipe 78 with an adjusting valve V3, so that it is a mixture of gas and air which through a burner 82 is led into the lower portion of the chamber.

When the retort furnace 60 is to be operated the cover 64 is removed from one of the retort chambers 62, which is thereupon filled with refuse. Then the cover 64 is again closed and a fuel gas mixture is led to and burnt within the chambers 70 on each side of the retort chamber 64. Thereby the refuse in the chamber 62 is heated and, consequently, degassed.

During the first part of the heating of the refuse in the retort chamber 62 the refuse will give off comparatively large quantities of water, and, as at the same time the temperature is fairly low, this will result in that a substantial amount of hydrogen and a considerable amount of carbon dioxide will be produced, whereas the amount of carbon monoxide will be rather low. When the water vapours in the refuse have been removed, and the dry distillation begins, the content of carbon monoxide in the outgoing gas will increase considerably, whereas the content of carbon dioxide as well as of hydrogen will decrease. Consequently, often it will be advantgeous that at least during the last part of the heating in the retort further water vapours are added to reduce the content of carbon monoxide. This addition may take place through a pipe 84 extending through the lower cover 66 and connected by means of a flexible tube 86 to a steam pipe 88 with adjusting valve V4.

Within the retort chamber 62 the refuse is heated to a temperature between 900 and 1200° C. whereby the refuse is degassed as completely as possible. Especially all plastic matters are fully degassed. However, even after the dry distillation within the chamber 62 the refuse will be able to give off further amounts of gas. Therefore, it is to be preferred that when after the degassing operation the remainder in the chamber 62 is removed therefrom by removal of the lower cover 66, the remainder is carried to a normal air gas generator in which it is fully degassed by partial combustion, which partial combustion is so much easier to carry out since the remainder when being removed from the retort chamber 62 has a high temperature of above 1000° C.

The gas prduced within the retort chamber 62 leaves this chamber through an oblique gas pipe 94 at the upper end thereof, from which through a pipe 94 the gas streams to a cyclon filter 96, in which all coarser impurities are removed from the gas. From the filter 96 the gas is led through a pipe 98 to a tubular condenser 100, in which it heats water passing through the tubes of the condenser, which water is then used, for example, for heating purposes. The gas leaves the condenser through a pipe 102, and the condensed water is led, through a pipe 104, to a tank 106.

Owing to the gas having passed the cyclone filter 96 or a like filter before reaching the condenser 100, there is no danger that coarser impurities present in the refuse gas will be deposited in the condenser and thereby reduce its efficiency.

The gas leaving the condenser or heat exchanger 100 may be led to a gas burner for immediate use or to a cleaning device of conventional type, in which it is cleaned, and then stored in a gas holder.

EXAMPLE 1

Garbage was used which was obtained from a district with cottages on the outskirts of a town, which refuse contained a substantial amount of garden refuse and comparatively little paper. From the point of view of a degassing operation this type of refuse has a very poor composition. By analyzing an average refuse sample it was found that the refuse contained 56.8% water and 43.2% dry matter.

The refuse which had to be degassed in a retort furnace as the one shown in FIGS. 1 and 2 was sorted and larger pieces of glass and iron were removed to avoid damage being done to the refractory wall of the retort chamber 62. By weight, 501 kg. of the refuse was introduced into the retort chamber 62.

In this chamber 62 the refuse was now heated to a temperature of between 1000 and 1200° C., and 170 m.$^3$ gas and 10 kg. tar and other materials able to be washed out of the gas were developed. The quantities of ashes and coke present in the chamber after the degassing represented 99 kg., and as the water content of the refuse charge was 285 kg., a refuse quantity of 117 kg. had thus been degassed. The removed amount of ashes and coke had a volume of about $\frac{1}{15}$ of the original volume of the refuse.

The gas taken from the retort chamber 62 had after cleaning on an average the following composition:

Carbon dioxide, $CO_2$ _____percent__ 20.3
Heavy hydrocarbons, $C_nH_m$ _____do___ 0.1
Oxygen, $O_2$ _____do___ 0
Carbon monoxide, CO _____do___ 19.6
Methane, $CH_4$ _____do___ 10.7
Hydrogen, $H_2$ _____do___ 49.3
Relative density _____ .593
Gross caloric value, $H_s$ _____kcal./m.$^3$__ 3715
Net caloric value, $H_i$ _____ kcal./m.$^3$ 2925

Gas volume produced per kg. refuse was about 0.30 m.$^3$.

A refuse gas of this kind is, on account of its relatively high caloric value and its relatively small relative density, well suited for being mixed into town gas for adjusting the caloric value of the latter. On the other hand it suffers from the drawback that it has a very great content of carbon monoxide, which, however, in a simple manner can be essentially reduced by a known toxicity removing operation. Also such refuse gas is well suited for mixing with propane gas or split gas.

EXAMPLE 2

Air dried sewage sludge was used, which was filled in paper bags impregnated with plastic material, which bags were in closed state put into the retort chamber 62, and in all 148 kg. sewage sludge was used.

In the chamber 62 the refuse was now heated to a temperature of between 900 and 1000° C. and freed thereby 50 m.$^3$ refuse gas. The quantities of ashes remaining in the chamber after the degassing represented 38 kg.

The gas obtained had on an average the following composition:

Carbon dioxide, $CO_2$ _____percent__ 9.3
Heavy hydrocarbons, $C_nH_m$ _____do____ 0
Oxygen, $O_2$ _____do____ 0
Carbon monoxide, CO _____do____ 5.5
Methane, $CH_4$ _____do____ 13.5
Hydrogen, $H_2$ _____do____ 66.1
Nitrogen, $N_2$ _____do____ 5.6
Hydropen sulphite _____do____ −0.01
Relative density _____do____ 0.370
Gross caloric value _____kcal./m.$^3$__ 3467
Net caloric value _____kcal./m.$^3$__ 3019

As will appear from the above, refuse normally contains very large amounts of water for the evaporation of which, during the degrassing process, a substantial amount of energy is required. Therefore, immediately after its production, that is while still hot, the refuse gas is conducted through the heat exchanger 100 for the exploitation of the condensation heat from the water vapours contained in the gas, so that it becomes possible to retract and make the heat in the water vapours useful, for example for heating purposes.

EXAMPLE 3

In this example garbage was taken from a town district having several storied houses. The refuse contained a substantial amount of combustible material, but also a good deal of wet kitchen refuse, and the like refuse. From the technical point of view of producing gas the composition must, however, be considered mean, just as it must be considered as representing an average of the refuse quantity of a minor town consisting, as it does, of a mixture of cottage refuse, house refuse and industrial refuse.

Of the refuse, which had a water content of about 45%, 366 kg. were fed to the retort chamber 62. The gas leaving said retort was conducted through the cyclone filter 96 and from there through the tubular condenser 100 in which the water vapour contained in the gas was condensed while the gas was cooled to a temperature of about 70° C., and the refuse gas was then conducted through a water bath and stored.

The refuse fed to the retort was within the same heated to a temperature of between 1000 and 1200° C.

After the degassing process 66 kg. ashes and coke were extracted from the chamber 62, so that the degassed amount of refuse represented 270 kg. From this refuse quantity 165 m.$^3$ gas and 13 kg. tar and corresponding impurities able to be washed out were produced. In the tubular condenser 100 90600 kcal. was regenerated.

On an average the refuse gas obtained had the following composition:

| | | |
|---|---|---|
| Carbon dioxide, $CO_2$ | percent | 15.9 |
| Heavy hydrocarbons, $C_nH_m$ | do | 0.6 |
| Oxygen, $O_2$ | do | 0 |
| Carbon monoxide, CO | do | 24 |
| Methane, $CH_4$ | do | 12.5 |
| Hydrogen, $H_2$ | do | 43.9 |
| Nitrogen, $N_2$ | do | 3.1 |
| Hydrogen sulphide, $H_2S$ | do | —0.01 |
| Relative density | | 0.615 |
| Gross caloric value | kcal./m.³ | 3374 |
| Net caloric value | kcal./m.³ | 3030 |

Gas volume produced per kg. raw refuse was about 0.5 m.³.

Also this gas had a satisfactory relative density and a satisfactorily high caloric value.

Also in this case the withdrawn amount of coke and ashes represented a volume corresponding to about 1/15 of the volume of the received refuse which volume can, however, be further reduced by transferring the refuse received from the retort furnace 60 to an air gas generator.

Whether the coke and the ashes are burnt completely in a subsequent air gas generator or are used directly as dumping material, its transport to a dump will cause much lower expenses than the transport of the raw refuse. Moreover, it has been found that the withdrawn ashes can be used for soil improvement purposes especially on a heavy clay earth and especially for fields having not sufficient phosphoric acid and boron.

EXAMPLE 4

In an ordinary gas ring to which gas was conducted at an excess pressure of 60 mm. VS and which at that pressure was able to burn 430 l./h. ordinary coal gas, different mixtures of such gas and refuse gas produced according to the aforesaid Example 2, and mixtures of said refuse gas and propane, were burnt.

The following mixtures were used:

| No. | Mixture | Combustion, l./h. | Relative density | Caloric gross | Value net |
|---|---|---|---|---|---|
| 1 | Coal gas | 430 | 0.508 | 4,235 | 3,755 |
| 2 | 75% coal gas plus 25% refuse gas | 430 | 0.541 | 3,965 | 3,525 |
| 3 | 50% coal gas plus 50% refuse gas | 420 | 0.570 | 3,730 | 3,325 |
| 4 | Pure refuse gas | 415 | 0.615 | 3,374 | 3,036 |
| 5 | 5% propane plus 95% refuse gas | 400 | 0.679 | 4,275 | 3,865 |
| 6 | 9% propane plus 91% refuse gas | 380 | 0.718 | 5,160 | 4,680 |

The following results were obtained:

| Mixture | Developed amount of heat in Kcal./h. | In percent compared with coal gas | Combustion |
|---|---|---|---|
| 1 | 1,615 | 100.0 | Fine combustion, soft flame, ordinary core, no tendency to backshooting. |
| 2 | 1,516 | 93.9 | Fine combustion, rather soft flame, slightly shorter core, no tendency to backshooting. |
| 3 | 1,396 | 86.4 | Good combustion, rather hard flame, short core, no tendency to backshooting. |
| 4 | 1,201 | 74.4 | Good combustion, hard flame, short, sharp core, slight tendency to backshooting. |
| 5 | 1,546 | 95.7 | Fine combustion, soft flame, ordinary core, no tendency to backshooting. |
| 6 | 1,778 | 110.1 | Good combustion, very soft flame, very long core, no tendency to backshooting. |

It will be understood that this invention is susceptible to modification in order to adapt it to different usages and considerations and, accordingly, it is desired to comprehend such modifications within this invention as may fall within the scope of the appended claims.

What is claimed is:

1. A method for disposing of refuse materials comprising the steps of:
    (a) feeding the refuse materials to an externally heated retort;
    (b) heating the refuse materials to a temperature of between about 900° C. and about 1200° C. for producing refuse gas;
    (c) conducting the refuse gas through a heat exchanger where the gas is cooled and gives off heat thereby to utilize the condensation heat of the water vapor contained in the refuse gas; and
    (d) mixing the cooled refuse gas with a base gas.

2. The method according to claim 1 wherein the refuse gas is passed, prior to being cooled in said heat exchanger, through a dry cleaning means.

3. The method according to claim 2 wherein said dry cleaning means is a cyclone filter.

4. The method according to claim 1 wherein water vapor is introduced into the retort in at least a latter stage of said heating step.

5. The method according to claim 1 wherein after said heating step, ash and coke materials remaining in said retort are withdrawn therefrom and while still hot are placed in a gas generator for subjecting to a further partial combustion.

References Cited

UNITED STATES PATENTS

| 1,189,638 | 6/1916 | Testrup et al. | 48—209 |
| 1,777,449 | 10/1930 | Rath | 48—197 |
| 3,254,976 | 6/1966 | Wolf et al. | 48—197 |

MORRIS O. WOLK, Primary Examiner

M. D. BURNS, Assistant Examiner

U.S. Cl. X.R.

48—197